United States Patent Office 3,317,630
Patented May 2, 1967

3,317,630
"ONE-KETTLE" PROCESS FOR PREPARING A COMPOSITION CONTAINING ALKYLATED MELAMINE AND UREA FORMALDEHYDE CONDENSATES
Ernest C. Yuille, Plainfield, N.J., assignor to American Cyanamid Company, Stamford, Conn., a corporation of Maine
No Drawing. Filed Nov. 15, 1962, Ser. No. 238,022
2 Claims. (Cl. 260—849)

This invention relates to an improved process for preparing compositions containing mixtures of water-soluble thermosetting aminoplasts. More particularly, this invention relates to an improved process for preparing compositions containing water-soluble mixtures of water-soluble methylated methylol melamine and water-soluble methylated methylol urea. Still more specifically, this invention relates to an improved process for preparing aqueous solutions of mixtures of methylated polymethylol melamines containing at least four methylol groups and at least partially methylated dimethylol urea.

For some time, melamine-formaldehyde condensates and urea-formaldehyde condensates, as well as mixtures of these materials, have been employed in the finishing of textile materials and in particular in the finishing of cellulosic textile materials. Such mixtures are of value in finishing cellulosic textile materials to impart crease resistance and wrinkle recovery thereto. Materials so finished are known not to yellow excessively due to chlorine retention nor to suffer serious tensile strength loss when scorched subsequent to chlorine bleaching. An additional advantage of mixtures of these materials is that their pad bath solutions are characterized by excellent stability.

Mixtures of these methylated methylol melamines and methylated methylol ureas are usually prepared by mixing in the desired ratios separately prepared methylated methylol melamine and methylated methylol urea. The principal reason for so preparing such mixtures was that experience had taught that comparable mixtures could not be prepared in what may be termed a "one-kettle" process due to the difficulty of producing melamines and ureas having the desired degree of methylolation and etherification because of the fact that the reaction rates for melamine and urea with formaldehyde are different. Additionally, of course, is the difficulty of producing such mixtures by a "one-kettle" process without producing undesirably large amounts of polymeric material in the product, which material restricts the utility of such products as a creaseproofing resin and in addition adversely affects the stability of the final product during storage and use.

As will be readily appreciated, the preparation of the components of such a mixture individually requires greater usuage of equipment and larger processing times and thus detracts from the economics of such products.

It is therefore the principal object of the present invention to provide a direct and simple "one-kettle" process for manufacturing mixtures of methylated polymethylol melamines containing at least four methylol groups and methylated dimethylol ureas.

A further object of this invention is to provide a process for producing such mixtures, which mixtures are fully comparable to mixtures prepared by blending individually prepared components and in some instances are superior thereto.

These and other objects and advantages of the present invention will become more apparent from the detailed description thereof set forth hereinbelow.

In accordance with the present invention, a "one-kettle" process is provided for preparing a water-soluble composition containing a partially methylated polymethylol melamine having from 4 to 6 methylol groups and a partially methylated dimethylol urea in which the melamine and urea components are present in relative molar ratios of from about 1:3 to about 3:1. In accordance with the process, relative amounts of 1 mole of melamine are condensed with from 5 to 18 moles of formaldehyde at a pH of from 9 to about 11.0, and preferably from 9.5 to 10.5, in a water-methanol reaction medium to form a melamine-formaldehyde condensate having from 4 to 6 methylol groups. After formation of the melamine-formaldehyde condensate urea is added to the reaction mixture along with additional formaldehyde, if necessary, and methylolation of the urea is carried out at pH of from 9 to about 11.0 to form dimethylol urea. The pH of the reaction medium is then adjusted to from 4 to about 6 and the methylolated mealmine and urea are reacted with methanol. The methanol should be present in the reaction mixture in relative amounts of from 1.1 to about 1.8 moles of methanol per mole of combined formaldehyde and etherification should be carried out until at least 50% of the available methylol groups are methylated. Thereafter, the pH of the mixture is adjusted to a value of at least 8 and preferably to about 10, and the solution concentrated to a solids content of from 70 to about 90% and a free formaldehyde content of less than 3.5% by weight.

By a "one-kettle" process, as that term is employed herein, it is meant a process in which the reactions required to form the final product are at least in part carried out simultaneously in a single kettle as distinguished from separate preparation and blending of the components.

By the term "cellulose textile material" and similar expressions as they are employed herein, it is meant fabric containing at least 50% fiber of cellulosic origin such as cotton or rayon, whether the fabric is knitted, felted, woven, or otherwise formed. Preferably, it is a woven cotton fabric. Materials such as silk, wool, and synthetic fibers such as acetate, nylon, polyester and acrylic fibers may be blended with the cellulose fibers.

As noted above, the process of this invention is applicable to product mixtures wherein the molar ratio of the melamine component to the urea component is between 1:3 and 3:1, respectively, though a molar ratio of about 1:1 is preferred. The melamine-formaldehyde component will contain from 4 to 6 methylol groups and in the final product will be at least 40% methylated. The urea-formaldehyde condensate will have 2 methylol groups and will be at least 70% methylated.

In carrying out the process, the melamine-formaldehyde reaction is carried out prior to the urea-formaldehyde reaction because the urea cannot be methylolated prior to the melamine, nor can they be methylolated simulanteously. These latter two procedures do not produce the desired products employing reasonable excesses of formaldehyde because the relative ease of reaction between the urea and formaldehyde eliminates the rather large excess of formaldehyde needed to drive the melamine methylolation reaction. If extremely large excesses of formaldehyde are employed, it is conceivable that the urea could be methylolated prior to the melamine or that the urea and melamine could be methylolated simultaneously. However, under these circumstances the final product contains detrimentally large amounts of unreacted or free formaldehyde which must be removed.

The formaldehyde employed is preferably as an aqueous solution containing 37 or 44% formaldehyde, although formaldehyde in other forms may be employed.

The reaction between formaldehyde and the melamine and the urea, as noted above, is carried out at a pH of from 9 to 11.0 and preferably at a pH of between 9.5 and 10.5. Suitable alkalizing agents for adjustment and maintenance of pH at a value above 9 in the practice of this process include sodium hydroxide, potassium hydroxide, barium hydroxide and their equivalents.

As noted, the reaction between the melamine and formaldehyde and urea and formaldehyde is carried out in a water-methanol reaction medium, which medium usually contains at least 40% of methanol. It is essential that methanol be present initially or at the time of reaction between melamine with formaldehyde because it prevents solidification and maintain the product as a slurry. In addition, the presence of methanol means that less water need be stripped in the final concentration steps.

The amount of formaldehyde employed will of course depend on the relative amounts of melamine and urea and the number of methylol groups to be introduced into the melamine. The methylolation of melamine beyond the introduction of the first three methylol groups requires an excess of formaldehyde over that reacting with the melamine. A minimum of about 5 moles of formaldehyde is required for the introduction of four methylol groups. In general, five methylol groups require about 6 moles of formaldehyde in the reaction medium and the introduction of the sixth methylol group requires a minimum of about 9 moles of formaldehyde. It will be noted that large excesses of free formaldehyde are undesirable because such excesses are uneconomical to use and are required to be removed from the final product.

A slight excess, a minimum of about 10 to 20% excess, of formaldehyde is all that is required for the formation of the dimethylol urea.

From the above it will be appreciated that with certain end products all of the formaldehyde may be present at the start of the "one-kettle" process, i.e. during the condensation of formaldehyde with melamine. However, with other end products it is advantageous to add the formaldehyde in two stages, the second stages being just prior to the addition of urea. Such a procedure has been found to be ideally suited for the preparation of a water-soluble equimolar mixture containing at least 40% methylated pentamethylol melamine and 70% methylated dimethylol urea, which is partially polymerized. In preparing products having a tetramethylol melamine and a pentamethylol melamine as a base material, the total amount of formaldehyde employed is from about 7 to about 18 moles, of which from 5 to 18 moles may be present during the methylolation of the melamine, and from 0 to 6 moles may be present or added to the reaction medium during the formation of dimethylol urea. Where the melamine-formaldehyde condensate is a hexamethylol melamine, the total formaldehyde employed may extend from 9 to 27 moles and preferably all of it is added prior to the addition of urea to insure the formation of the hexamethylol condensate. It will be appreciated with regard to the above description relative to the amounts of formaldehyde employed that the range of moles of formaldehyde relative to melamine and urea are for mixtures of these materials within the molar ratios of from 1:3 to 3:1, respectively.

In carrying out the above-described process, the melamine-formaldehyde condensation reaction is carried out at a temperature above 60 and preferably at a temperature above 85° C. up to reflux, until the desired degree of methylolation is obtained, as indicated by assay for unreacted formaldehyde.

The urea-formaldehyde condensation reaction is carried out at a temperature between 20° and 90° C. (reflux) and preferably between 40 and 70° C. The reaction is continued until the desired degree of methylolation is obtained, as indicated by assay for unreacted formaldehyde.

During methylation, at least 1.1 mole and preferably between 1.3 and 1.8 moles of methanol should be present for each mole of reacted or methylol formaldehyde. If all the methanol has not been introduced initially so as to constitute part of the methanol-water reaction medium, additional methanol must be added at this point in the reaction.

The methylation reaction is carried out at a pH of from 4 to 6 and preferably from between 4.7 and 5.5. pH adjustment on the acidic side is achieved by adding an organic acid such as oxalic, formic or acetic acid, or mineral acid such as nitric, hydrochloric or sulfuric acid.

The methylation reaction is carried out at a temperature of between 50° C. and reflux temperature (84–86° C.) and preferably at reflux. The reaction is continued until the desired degree of methylation is obtained, normally about five minutes after reflux is required. The pH of the reaction mixture is then adjusted to a value of between 9.5 and 9.8 with suitable alkali such as sodium or potassium hydroxide and the reaction mixture is concentrated. The concentration step consists of distillation or evaporation of volatile materials including methanol, water and formaldehyde. It is preferably done in vacuo and is continued until a solids content of over 70% and preferably over 90% is obtained. When the concentration is continued until a solid content of over 90% is obtained, the amount of unreacted formaldehyde remaining in the product will be below 3.5% and usually below 3%, based on the weight of the final product.

Thereafter, water may be added to adjust to the desired solids content and the pH may be adjusted with a suitable acid to a value of from 8 to 9.

In accordance with a preferred embodiment of this invention, a reaction mixture of 9 moles of formaldehyde as a 44% formalin solution having a pH of from 9.5 to 10.5 through the addition of sodium hydroxide, 8.5 moles of methanol and 1 mole of melamine, is heated at reflux (about 88° C.) for 20 minutes. The mixture is cooled to 50° C. and 1 mole of urea is added. The temperature is then maintained at 50° C. for 1 hour, whereupon 2.85 moles of methanol are added and the pH is adjusted to between 5.0 and 5.5 with oxalic acid. The reaction mixture is refluxed for 5 minutes, and the pH is then adjusted to between 9.5 and 9.8 with sodium hydroxide. The batch is concentrated by distilling in vacuo until the total solids is between 90% and 95%. The total solids is then adjusted to about 80% by adding water, and the pH to about 8.5. The content of free formaldehyde will be about 3%.

The product prepared by the above preferred procedure is believed to be a mixture of 1 mole of approximately 50% methylated polymethylol melamine containing an average of about 5.3 methylol groups and 1 mole of approximately 70% methylated dimethylol urea.

When applied to cellulosic fabrics, this product is similar in all respects to a finish made by mixing equal moles of preformed, approximately 70% methylated pentamethylol melamine and preformed, approximately 70% methylated dimethylol urea.

The blends or mixtures of this invention may be applied by any of the conventional textile finishing procedures, as for example padding, spraying, dipping, immersing and the like. Normally, they will be applied in amounts of from between 1 and about 15% based on the dry weight of the cellulosic textile material. Conventional catalyst may be employed such as the metal salts, including magnesium, zinc and aluminum salts such as magnesium chloride, zinc nitrate, aluminum chloride and the like. These and other catalysts known to be useful for aminoplasts in the textile finishing art may be employed in conventional amounts. After application, textile material so tested is dried and cured in the usual manner.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

Example 1

A suitable reaction vessel was charged with 1223 parts of 44% formalin (450 parts, 17 moles of formaldehyde) and the pH was adjusted to 10.0 with caustic soda. After adding 544 parts (17 moles) of methanol and 252 parts (2.0 moles) of melamine, the reaction mixture was heated at the reflux temperature (88° C.) for 20 minutes. The temperature was lowered to 50° C., and 120 parts (2.0 moles) of urea was added. The temperature was then held at 50° C. for 1 hour. When 184 parts (5.75 moles) of methanol and 2.5 parts of oxalic acid (pH 5.3) had been added, the reaction mixture was refluxed (86° C.) for 5 minutes. The pH was then adjusted to about 9.7 with 3.5 parts of 50% aqueous caustic soda and the mixture was distilled in vacuo until a solids content of 91.4% was attained. Water was then added until the solids content was 80% and the pH was adjusted to 8.6. The product contained 3.2% of unreacted formaldehyde.

Example 2

Resin A—product of Example 1
Resin B—blend of 1 mole of approximately 50% methylated pentamethylol melamine and 1 mole of approximately 70% methylated dimethylol urea
Catalyst C—magnesium chloride
Catalyst D—zinc nitrate The above resins were applied to 80 x 80 cotton percale at the 5% resin solids level (O.W.F.) with either 12% of Catalyst C or 10% of Catalyst D based on resin solids. The applications were made from aqueous solutions by standard padding procedures. The treated fabrics were dried for 1 minute at 225° F. and cured for 1.5 minutes at 350° F.

The treated fabrics were tested for wrinkle recovery before and after laundering, tensile strength, strength loss due to chlorine retention before and after laundering, hand and yellowing before and after laundering with chlorine present. The results are shown in Table I.

The wrinkle recovery tests were made by Tentative Test Method 66–1959T, 1961 Technical Manual of the American Association of Texile Chemists and Colorists, volume 37, page 155.

The tensile strength measurements were made on a Scott tensile strength tester according to ASTM standards.

The tensile strength loss due to chlorine retention and scorching was measured by Standard Test Method 92–1958, page 118 of the above reference.

The yellowness index was calculated by the equation $$\text{Yellowness Index} = 70\left(1 - \frac{R_{455}}{R_{577}}\right)$$

where $R_{455}$ and $R_{577}$ are reflectance values obtained on a recording spectrophotometer using a magnesium carbonate block as a reference standard at the wavelengths of 455 millimicrons and 577 millimicrons, respectively.

The sour washes were done in a Najort washer using 75 liters of water, 11 g. of a synthetic detergent, 0.01% available chlorine, 6-lb. load of cloth and a wash cycle of 20 minutes at 160° F. This is followed by a clear rinse of 10 minutes at 140° F., a second clear rinse of 5 minutes at 120° F., and a final sour rinse of 5 minutes at 120° F. with 4.5 g. of zinc silicofluoride in the rinse water. The cloth is tumble dried before the yellowness test.

The "200° F. washes" were carried out according to Tentative Test Method 96–1960T, page 121 of the above reference, using a temperature of 200° F.

The "LCW washes" were carried out in an automatic washing machine using water at 140° F. with neutral soap and chlorine added.

TABLE I

|  | Resin | | | |
|---|---|---|---|---|
|  | A | B | A | B |
|  | Catalyst | | | |
|  | C | C | D | D |
| Wrinkle Recovery: Degrees, W+F: | | | | |
| Initial | 245 | 251 | 257 | 255 |
| After 3 Sour Washes | 220 | 215 | 228 | 230 |
| After 5 "200° F. Washes" | 221 | 206 | 235 | 228 |
| Tensile Strength, W+F, p.s.i. | 54 | 61 | 49 | 46 |
| Chlorine Retention: Tensile Strength Loss, Percent: | | | | |
| Initial | 26 | 19 | 3 | 0 |
| After 5 "200° F. Washes" | 57 | 62 | 36 | 45 |
| Hand | (¹) | (²) | (²) | (²) |
| Yellowness Index: | | | | |
| Initial | 2.4 | 2.4 | 2.7 | 2.7 |
| After 9 "LCW Washes" | 2.4 | 2.7 | 3.1 | 3.2 |

¹ Standard.
² Equal.

From a review of Table I, it will be apparent that the composition of this invention is fully comparable to a similar composition prepared by producing the individual components of the mixture and thereafter blending, and in fact the finish of this invention had slightly better resistance to degradation from chlorine.

It will be apparent that the present process, while described as being batchwise, may be rendered continuous by the adaption of conventional engineering techniques.

I claim:

1. A process for preparing a water-soluble resin composition containing a partially methylated polymethylol melamine having from 4 to 6 methylol groups and partially methylated dimethylol urea, said melamine and said urea being employed in relative molar ratios of about 1:3 and 3:1, which comprises condensing melamine with from 5 to 18 moles of formaldehyde at a pH of from 9 to about 11.0 in a water-methanol reaction medium, at a temperature above 60° C. up to reflux to form a melamine-formaldehyde condensate having from 4 to 6 methylol groups, adding urea at a pH of from 9 to about 10.5 to said reaction mixture and reacting said urea with formaldehyde at a temperature between 20° and 90° C. so as to form dimethylol urea, adjusting the pH of the reaction medium to from 4 to about 6 and reacting said composition with methanol at a temperature of between 50° C. and reflux, said methanol being present in the mixture in relative amounts of 1.1 to about 1.8 moles of methanol per mole of combined formaldehyde and until at least 50% of the available methylol groups are methylated, adjusting the pH of the mixture to at least 8 and concentrating the solution to a solids content of at least 80% and a free formaldehyde content of less than 3.5% by weight.

2. A process for preparing a water-soluble resin composition of an equal mole mixture of a trimethylated pentamethylol melamine and partially methylated dimethylol urea, which comprises condensing melamine with from 6 to about 10 moles of formaldehyde at a pH of from 9 to about 11.0 in a water-methanol reaction medium at a temperature above 60° C. up to reflux to form a pentamethylol melamine, adding urea at a pH of from 9 to about 11.0 to said reaction mixture and reacting said urea with formaldehyde at a temperature between 40 and 70° C. so as to form dimethylol urea, adjusting the pH of the reaction medium to from 4 to 6 and reacting said composition with methanol at a temperature between 50° C. and reflux, said methanol being employed in the reaction medium in relative amounts of 1.1 to about 1.8 moles of methanol per mole of combined formaldehyde and until at least about 50% of the available methylol groups are methylated, adjusting the pH of the mixture to at least 8 and concentrating the solution to a solid content of at least 80% and a free formaldehyde content of less than 3.5% by weight.

References Cited by the Examiner

UNITED STATES PATENTS

| | | | |
|---|---|---|---|
| 2,684,347 | 7/1954 | Nickerson | 260—67.6 |
| 2,749,257 | 6/1956 | Knup | 260—849 |
| 2,995,541 | 8/1961 | Kropa et al. | 260—77.5 |
| 3,033,823 | 5/1962 | Malashevitz et al. | 260—55 |
| 3,052,570 | 9/1962 | Polansky et al. | 117—139.4 |
| 3,059,027 | 10/1962 | Clemens et al. | 260—553 |
| 3,067,176 | 12/1962 | Poon | 260—67.6 |
| 3,211,805 | 10/1964 | Herbes et al. | 260—849 |

WILLIAM H. SHORT, *Primary Examiner.*

SAMUEL B. BLECH, LOUISE P. QUAST,
*Examiners.*

H. E. SCHAIN, V. A. MORGENSTERN,
*Assistant Examiners.*

Dedication 3,317,630. —*Ernest C. Yuille,* Plainfield, N.J. "ONE-KETTLE" PROCESS FOR PREPARING A COMPOSITION CONTAINING ALKYLATED MELAMINE AND UREA FORMALDEHYDE CONDENSATES. Patent dated May 2, 1967. Dedication filed Mar. 4, 1983, by the assignee, *American Cyanamid Co.*

Hereby dedicates the remaining term of said patent to the Public.
[*Official Gazette May 31, 1983.*]